(12) United States Patent
Unni et al.

(10) Patent No.: US 11,734,522 B2
(45) Date of Patent: Aug. 22, 2023

(54) MACHINE LEARNING ENABLED TEXT ANALYSIS WITH SUPPORT FOR UNSTRUCTURED DATA

(71) Applicant: SAP SE, Walldorf (DE)

(72) Inventors: Abaya Unni, Palakkad (IN); Arun P John, Ernakulam (IN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 17/141,094

(22) Filed: Jan. 4, 2021

(65) Prior Publication Data

US 2022/0215186 A1 Jul. 7, 2022

(51) Int. Cl.
*G06F 40/58* (2020.01)
*G06N 20/00* (2019.01)
*G06V 30/416* (2022.01)

(52) U.S. Cl.
CPC .......... *G06F 40/58* (2020.01); *G06N 20/00* (2019.01); *G06V 30/416* (2022.01)

(58) Field of Classification Search
CPC ........ G06F 40/58; G06F 40/258; G06F 40/18; G06N 20/00; G06N 3/08; G06N 20/10; G06N 20/20; G06V 30/416
See application file for complete search history.

(56) References Cited

U.S. PATENT DOCUMENTS

| | | | |
|---|---|---|---|
| 2018/0203924 A1* | 7/2018 | Agrawal | G06F 40/58 |
| 2020/0097759 A1* | 3/2020 | Nadim | G06V 30/412 |
| 2020/0176098 A1* | 6/2020 | Lucas | G16H 70/40 |
| 2021/0319356 A1* | 10/2021 | Wang | G06F 40/169 |
| 2021/0406266 A1* | 12/2021 | Chan | G06N 3/0445 |
| 2022/0262151 A1* | 8/2022 | Du | G06V 10/82 |
| 2022/0366129 A1* | 11/2022 | Dong | G06F 16/2246 |

OTHER PUBLICATIONS

Fang, J., Mitra, P., Tang, Z., & Giles, C. L. (Jul. 2012). Table header detection and classification. In Twenty-Sixth AAAI Conference on Artificial Intelligence. (Year: 2012).*

* cited by examiner

*Primary Examiner* — Bhavesh M Mehta
*Assistant Examiner* — Philip H Lam
(74) *Attorney, Agent, or Firm* — Mintz Levin Cohn Ferris Glovsky and Popeo, P.C.

(57) ABSTRACT

A method for analyzing an electronic document including structured data and unstructured data may include applying a machine learning model to determine whether one or more rows of the electronic document correspond to a header row. The machine learning model may be trained to determine whether one or more cells of a row corresponds to a header field by determining whether a text value included in the cells corresponds to an entity. A row may be identified as a header row based on an output of the machine learning model indicating more than a threshold quantity of cells included in the row correspond to a header field. At least a portion of the structured data included in the electronic document may be extracted based on the entity included in the cells of the row identified as the header row. Related systems and computer program products are also provided.

16 Claims, 6 Drawing Sheets

FIG. 2

| entity_name | text_value |
|---|---|
| grossAmount | account amount |
| grossAmount | amount in invoice currency |
| grossAmount | amnt in |
| grossAmount | remit amount |
| grossAmount | amount in |
| documentNumber | supplier number |
| documentNumber | vendor invoice |
| documentNumber | voucher num |
| documentNumber | document |
| documentNumber | your doc |
| documentNumber | your invoice details |
| currencyCode | currency |
| currencyCode | local currency |
| currencyCode | lcur |
| currencyCode | cur |
| description | text |
| description | desc |
| description | payment voided reason |
| description | remarks |
| description | notes |
| senderName | sender name |
| senderName | sendername |

MACHINE LEARNING ENABLED TEXT ANALYSIS WITH SUPPORT FOR UNSTRUCTURED DATA

FIELD

The present disclosure generally relates to machine learning and more specifically to machine learning enabled text analysis of at least partially unstructured data.

BACKGROUND

An electronic document may include structured data and/or unstructured data. Examples of structured data include Extensible Markup Language (XML), JavaScript Object Notation (JSON), and/or the like. For example, an XML document may include a plurality of XML elements, each of which being associated with a tag identifying the corresponding XML element as, for example, a heading, a paragraph, a table, a hyperlink, and/or the like. Alternatively and/or additionally, a JSON document may include a plurality of key value pairs. The key may be a string value identifying the corresponding value whereas the value may be any type of data including, for example, an array, a Boolean value, a number, an object, a string, and/or the like. By contrast, unstructured data may lack predefined format and/or organization, which may render electronic documents containing unstructured data more difficult to collect, process, and analyze.

SUMMARY

Methods, systems, and articles of manufacture, including computer program products, are provided for machine learning enabled text analysis. In one aspect, there is provided a system. The system may include at least one data processor and at least one memory. The at least one memory may store instructions that result in operations when executed by the at least one data processor. The operations may include: applying a machine learning model to determine whether a first row from a plurality of rows included in an electronic document corresponds to a header row, the machine learning model being trained to determine whether one or more cells in the first row corresponds to a header field by at least determining whether a text value included in the one or more cells corresponds to an entity; identifying, based at least on an output of the machine learning model indicating that more than a threshold quantity of cells included in the first row correspond to a header field, that the first row is a header row; and extracting, based at least on the entity included in the one or more cells of the first row, at least a portion of the structured data included in the electronic document.

In some variations, one or more of the features disclosed herein including the following features can optionally be included in any feasible combination. The structured data may include a second row from the plurality of rows that is subsequent to the first row in the electronic document.

In some variations, the machine learning model may be trained to determine a string metric measuring a difference between a first string corresponding to the text value included in the one or more cells and a second string corresponding to the entity. Whether the one or more cells correspond to the header field may be determined based at least on the string metric.

In some variations, a selection of one or more rows from the electronic document may be determined for analysis to identify the header row. The selection of the one or more rows may include the first row based at least on a likelihood of the first row being the header row.

In some variations, the electronic document may be an electronic spreadsheet including an unstructured data in addition to the structured data.

In some variations, the entity in each cell of the first row may identify the values occupying one or more subsequent rows in the corresponding column of the electronic document.

In some variations, a content of the first row of the electronic document may be converted to a string prior to applying the machine learning model.

In some variations, a content of the first row of the electronic document may be translated from a first language to a second language associated with the machine learning model prior to applying the machine learning model.

In some variations, the machine learning model may be a support vector machine, a boosted decision tree, a regularized logistic regression model, a neural network, and/or a random forest.

In some variations, the machine learning model may be trained based at least on training data that includes one or more different text values corresponding to each of plurality of entity names.

In another aspect, there is provided a method for machine learning enabled text analysis. The method may include: applying a machine learning model to determine whether a first row from a plurality of rows included in an electronic document corresponds to a header row, the machine learning model being trained to determine whether one or more cells in the first row corresponds to a header field by at least determining whether a text value included in the one or more cells corresponds to an entity; identifying, based at least on an output of the machine learning model indicating that more than a threshold quantity of cells included in the first row correspond to a header field, that the first row is a header row; and extracting, based at least on the entity included in the one or more cells of the first row, at least a portion of the structured data included in the electronic document.

In some variations, one or more of the features disclosed herein including the following features can optionally be included in any feasible combination. The structured data may include a second row from the plurality of rows that is subsequent to the first row in the electronic document.

In some variations, the machine learning model may be trained to determine a string metric measuring a difference between a first string corresponding to the text value included in the one or more cells and a second string corresponding to the entity. Whether the one or more cells correspond to the header field may be determined based at least on the string metric.

In some variations, the method may further include determining a selection of one or more rows from the electronic document for analysis to identify the header row, the selection of the one or more rows including the first row based at least on a likelihood of the first row being the header row.

In some variations, the electronic document may be an electronic spreadsheet including an unstructured data in addition to the structured data.

In some variations, the entity in each cell of the first row may identify the values occupying one or more subsequent rows in the corresponding column of the electronic document.

In some variations, the method may further include converting, to a string, a content of the first row of the electronic document prior to applying the machine learning model.

In some variations, the method may further include translating, from a first language to a second language associated with the machine learning model, a content of the first row of the electronic document prior to applying the machine learning model.

In some variations, the method may further include training, based at least on a training data, the machine learning model, the training data including one or more different text values corresponding to each of plurality of entity names.

In another aspect, there is provided a computer program product that includes a non-transitory computer readable storage medium. The non-transitory computer-readable storage medium may include program code that causes operations when executed by at least one data processor. The operations may include: applying a machine learning model to determine whether a first row from a plurality of rows included in an electronic document corresponds to a header row, the machine learning model being trained to determine whether one or more cells in the first row corresponds to a header field by at least determining whether a text value included in the one or more cells corresponds to an entity; identifying, based at least on an output of the machine learning model indicating that more than a threshold quantity of cells included in the first row correspond to a header field, that the first row is a header row; and extracting, based at least on the entity included in the one or more cells of the first row, at least a portion of the structured data included in the electronic document.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing machine learning enabled text analysis, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of an electronic document, in accordance with some example embodiments;

FIG. 3B depicts an example of training data, in accordance with some example embodiments;

Figure 1:
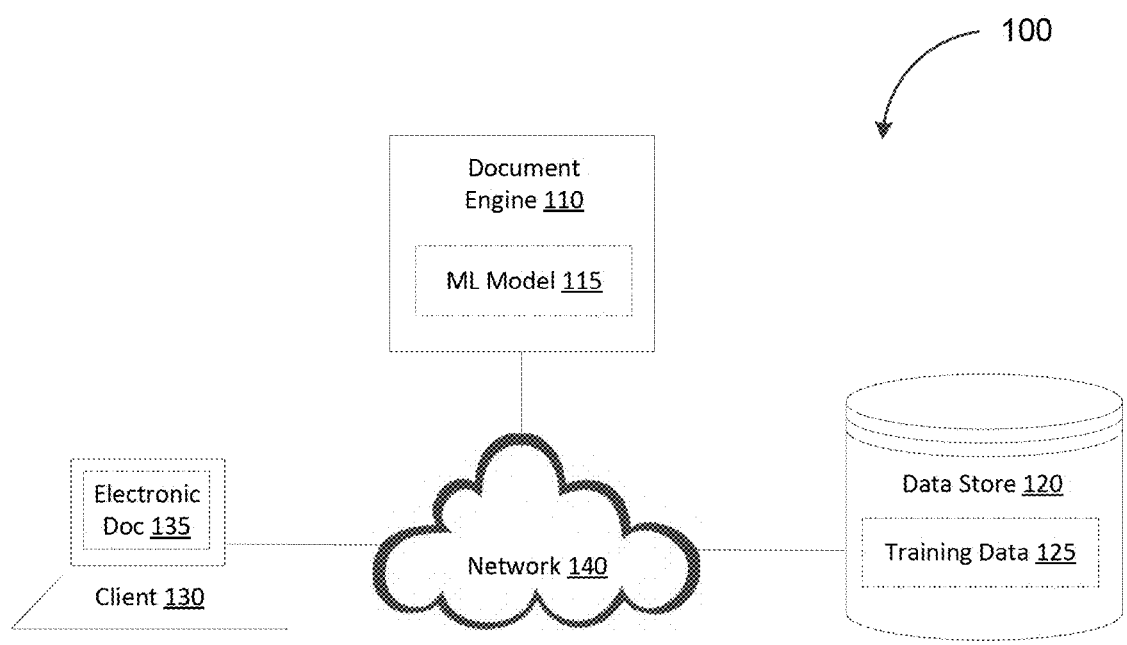
FIG. 1 depicts a system diagram illustrating an example of a machine learning enabled document analysis system, in accordance with some example embodiments.

When practical, like labels are used to refer to same or similar items in the drawings.

DETAILED DESCRIPTION

An electronic document may include unstructured data, whose lack of a predefined format and/or organization may render the electronic document difficult to collect, process, and analyze. For example, although an electronic spreadsheet may include one or more tables in which cells containing data are organized into rows and columns, the electronic spreadsheet may nevertheless include additional data that are not part of any tables. The presence of unstructured data, which lack the predefined tabular format of the structured data included in the electronic spreadsheet, may render the electronic spreadsheet difficult to process and analyze. For instance, the electronic spreadsheet may be a remittance or payment advice containing a breakdown of the invoices included in a payment. The presence of unstructured data in the electronic spreadsheet may thwart the identification and extraction of structured data included in the electronic spreadsheet including, for example, invoice number, payment date, payment currency, sender, amount remitted, and payment description.

In some example embodiments, a document engine may be configured to analyze an electronic spreadsheet containing structured data as well as unstructured data. For example, the document engine may analyze the electronic spreadsheet by at least identifying and extracting the structured data included in the electronic spreadsheet. In the event the electronic spreadsheet is a remittance or payment advice containing a breakdown of the invoices included in a payment, the document engine may identify and extract structured data corresponding to, for example, invoice numbers, payment dates, and the corresponding amount of remitted payment.

Structured data in the electronic spreadsheet may, as noted, occupy one or more tables. Each table in the electronic spreadsheet may include a header row having one or more header fields, each of which being a cell whose content identifies the entity of the values occupying the subsequent rows in the corresponding column. For example, the header row for a table may include a first header field indicating that a first column of the table contains values corresponding to a first entity and a second header field indicating that a second column of the table contains values corresponding to a second entity. Examples of entities may include invoice number, payment date, payment currency, sender, amount remitted, and payment description. Accordingly, in some example embodiments, the document engine may include a machine learning model configured to identify one or more header lines in the electronic spreadsheet. For instance, for a row in the electronic spreadsheet including one or more cells, the machine learning model may be trained to determine a likelihood of each cell being a header field by at least identifying an entity matching the content of each cell as well as a confidence score for the match. The document engine may identify the row as a header row if the output of the machine learning model indicates more than a threshold quantity of cells in the row are identified as header fields. Moreover, the document engine may extract, based at least on the header fields, at least a portion of the data from the one or more tables in the electronic spreadsheet.

FIG. 1 depicts a system diagram illustrating an example of a machine learning enabled document analysis system 100, in accordance with some example embodiments. Referring to FIG. 1, the machine learning enabled document analysis system 100 may include a document engine 110, a data store 120, and a client 130. As shown in FIG. 1, the document engine 110, the data store 120, and the client 130 may be communicatively coupled via a network 140. The data store 120 may be a repository for electronic data including, for example, a relational database, an object oriented database, a non-relational database, and/or the like. The client 130 may be a processor-based device including, for example, a smartphone, a computer, a tablet, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The document engine 110 may be configured to analyze an electronic document 135, which may be an electronic spreadsheet containing structured data as well as unstructured data. For example, the electronic document 135 may be a remittance or payment advice containing a breakdown of the invoices included in a payment, the document engine may identify and extract structured data corresponding to, for example, invoice numbers, payment dates, and the corresponding amount of remitted payment. Structured data in the electronic document 135 may occupy one or more tables. Each table in the electronic document 135 may include a header row having one or more header fields. As used herein, a "header field" may refer to a cell whose text value identifies the entity of the values occupying the subsequent rows in the corresponding column. For instance, the header row for a table may include a first header field indicating that a first column of the table contains values corresponding to a first entity and a second header field indicating that a second column of the table contains values corresponding to a second entity. Examples of entities may include invoice number, payment date, payment currency, sender, amount remitted, and payment description.

Figure 2:
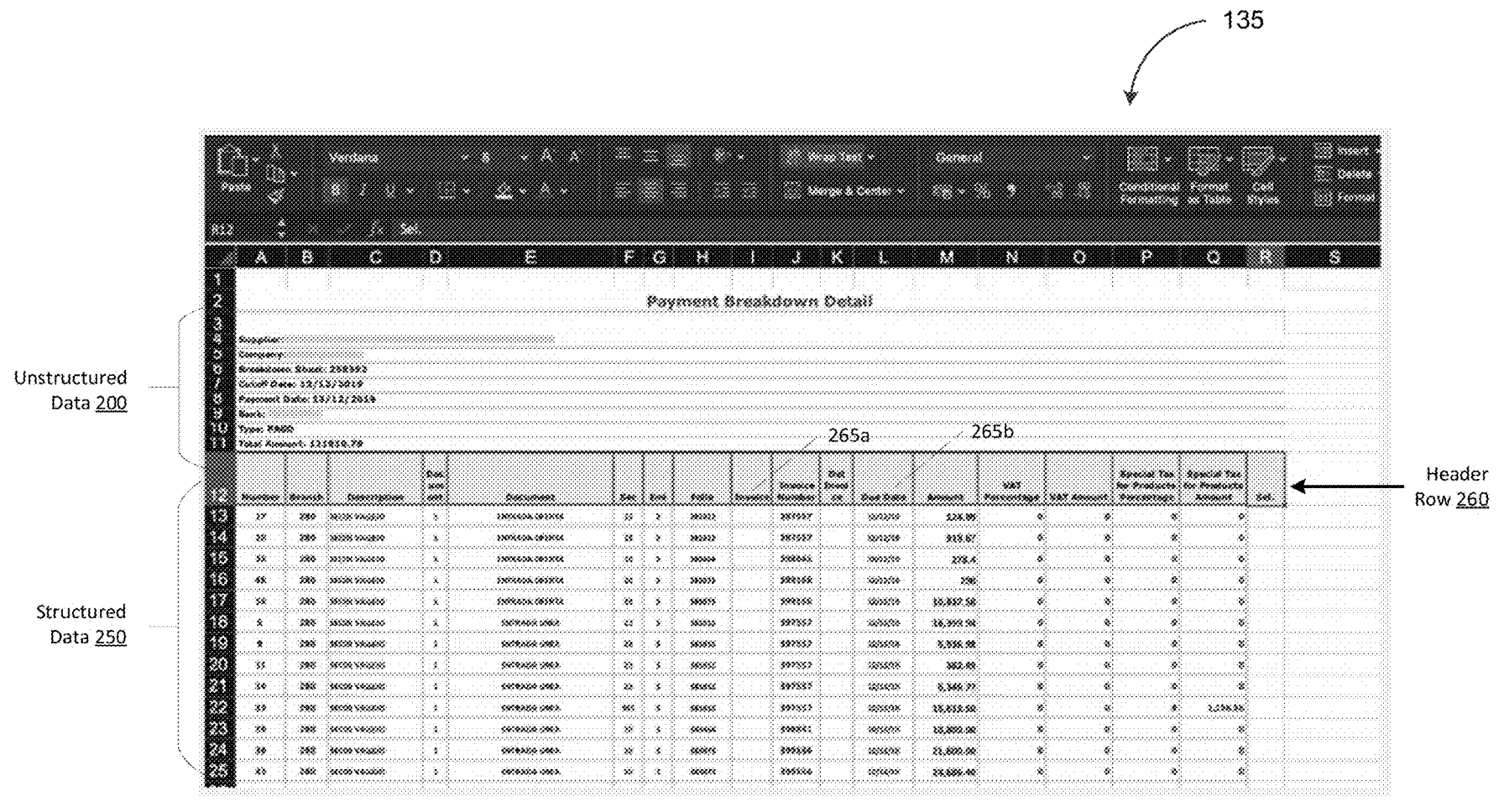

To further illustrate, FIG. 2 depicts an example of the electronic document 135, in accordance with some example embodiments. As shown in FIG. 2, the electronic document 135 may be an electronic spreadsheet in which a unstructured data 200 occupies rows 1-11 of the electronic document 135 and a structured data 250 occupies rows 12-25 of the electronic document 135. Moreover, in the example of the electronic document 135 shown in FIG. 2, the structured data 250 may include a header row 260 having one or more header fields, each of which being a cell whose text value corresponds to the entity of the values occupying the subsequent rows in the corresponding column. For example, the header row 260 may include a first cell 265a, which may be a first header field indicating that the subsequent rows of column J contain values corresponding to the entity "Invoice Number." Furthermore, as shown in FIG. 2, the header row 260 may include a second cell 265b, which may be a second header field indicating that the subsequent rows of column M contain values corresponding to the entity "Amount."

To analyze the electronic document 135, the document engine 110 may identify and extract at least a portion of the structured data 250 included in the electronic document 135. Referring again to FIG. 1, in some example embodiments, the document engine 110 may apply the machine learning model 115, which may be trained to identify the header line 260 included in the electronic document 135. For example, the document engine 110 may analyze each row of the electronic document 135 to identify the header row 260. To expedite the analysis of the electronic document 135, the document engine 110 may analyze some but not all of the rows in the electronic document 135. For instance, the document engine 110 may limit the analysis to a portion of the electronic document 135, such as the first n quantity of rows, that is most likely to contain the header row 260.

In some example embodiments, the document engine 110 may provide support for multiple languages in cases where the electronic document 135 contains content in one or more languages that are different than the language the machine learning model 115 is trained to recognize In some example embodiments, the document engine 110 may be configured to provide multi-language support in cases where the electronic document 135 contains content in one or more languages that are different than the language associated with the machine learning model 115. For example, in the example shown in FIG. 3, the electronic document 135 may include cells whose content is in a first language (e.g., Italian) and cells having content in a second language (e.g., English). If the machine learning model 115 is associated with the second language, then the document engine 110 may translate, to the second language, the content in the first language. Alternatively, if the machine learning model 115 is associated with a third language, then the document engine 101 may translate, to the third language, the content in the first language and the content in the second language. For example, the content of the first cell 265a may be in a first language while the content of the second cell 265b may be in a second language, and/or the like. Accordingly, prior to applying the machine learning model 115, the document engine 110 may convert, into strings, the content of one or more rows of the electronic document 135. Moreover, the document engine 110 may translate, from the first language and/or the second language to a third language associated with the machine learning model 115, the content of one or more rows of the electronic document 135.

As noted, to identify the header row 260, the document engine 110 may analyze a portion of the electronic document 135, such as the first n quantity of rows, that is most likely to contain the header row 260. Accordingly, for each row that is subject to analysis by the document engine 110, the machine learning model 115 may determine a likelihood that the content of each cell included in the row corresponds to an entity. For example, referring again to FIG. 2, the machine learning model 115 may determine, for each of the first cell 265a and the second cell 265b, an entity matching the content therein and a confidence score for the match. The header row 260 may be identified as such by the document engine 110 if the output of the machine learning model 115 indicates more than a threshold quantity of cells included in the header row 260 are header fields.

Figure 3A:
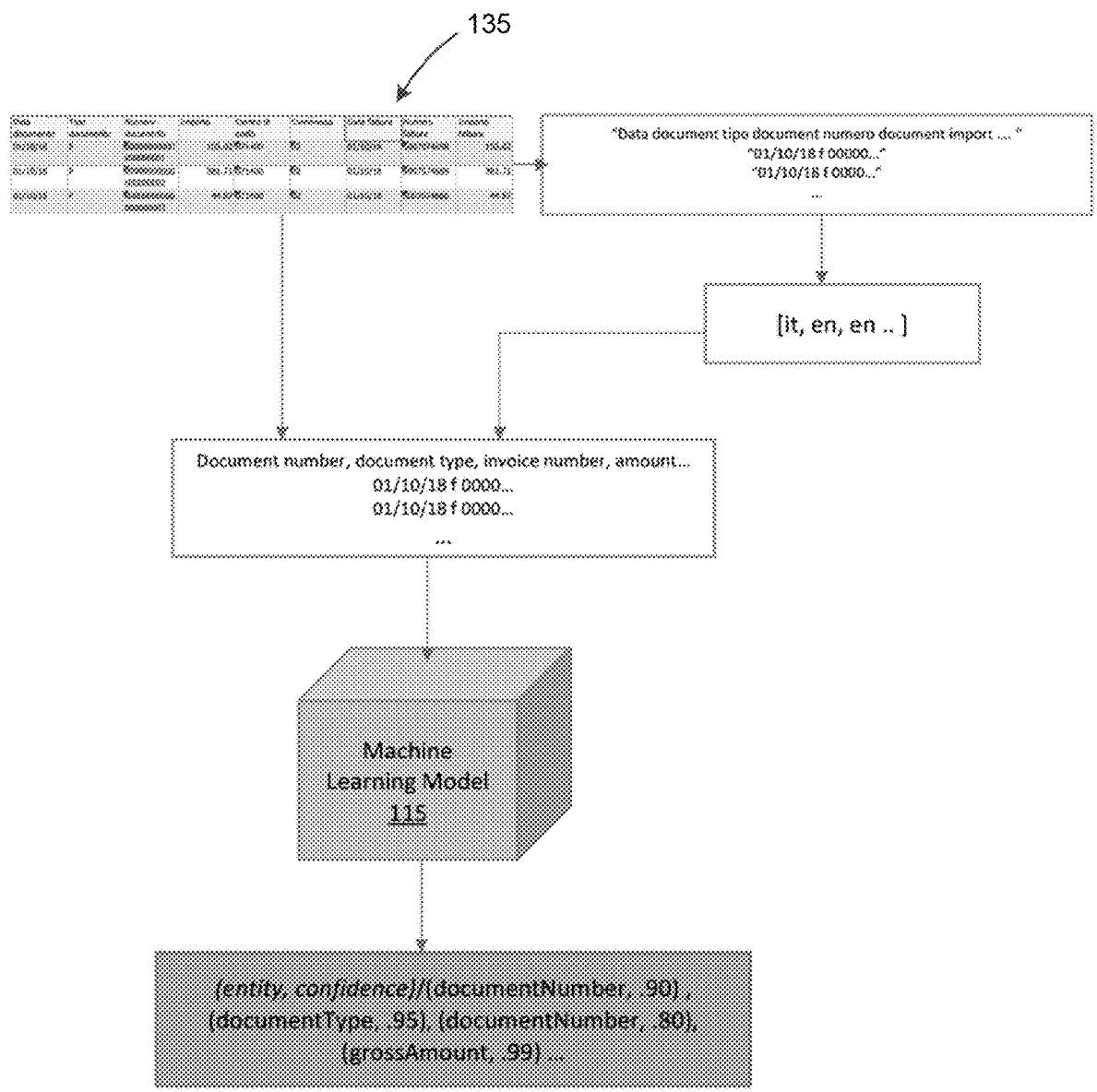
FIG. 3A depicts a schematic diagram illustrating an example of machine learning enabled text analysis, in accordance with some example embodiments.

To further illustrate, FIG. 3A depicts a schematic diagram illustrating an example of machine learning enabled text analysis, in accordance with some example embodiments. As shown in FIG. 3A, the document engine 110 may convert, into strings, the content of one or more rows of the electronic document 135. The document engine 110 may further identify the language of the contents of each cell included in the one or more rows of the electronic document 135. For example, in the example shown in FIG. 3, the electronic document 135 may include cells whose content is in a first language (e.g., Italian) and cells having content in a second language (e.g., English). If the machine learning model 115 is associated with the second language, then the document engine 110 may translate, to the second language, the content in the first language. Alternatively, if the machine learning model 115 is associated with a third language, then the document engine 101 may translate, to the third language, the content in the first language and the content in the second language.

Referring again to FIG. 3A, the document engine 110 may apply the machine learning model 115 in order to determine whether the content of each cell corresponds to an entity including, for example, invoice number, payment date, payment currency, sender, amount remitted, payment description, and/or the like. According to some example embodiments, the machine learning model 115 may be a support vector machine, a decision tree, a regularized logistic regression model, a neural network, a random forest, and/or the like. Moreover, the machine learning model 115 may include an application programming interface (API) for interacting with the machine learning model. For example, the document engine 110 may query the machine learning model 115 with a get_entity (account amount) request and receive, from the machine learning model 115, the entity "grossAmount" corresponding to the text value "account amount" included in the request.

The difference between two strings, such as a first string corresponding to an entity and a second string corresponding to the contents of a cell in the electronic document 135, may be measured based on one or more string metrics or string distance functions including, for example, Levenshtein distance, Damerau-Levenshtein distance, Sorensen-Dice coefficient, block distance, Hamming distance, Jaro-Winkler distance, simple matching coefficient, Jaccard coefficient, Tversky index, overlap coefficient, variational distance, Hellinger distance, Jensen-Shannon divergence, skew divergence, confusion probability, Tau metric, Fellegi and Sunters metric, maximal matches, grammar-based distance, term frequency inverse document frequency (TFIDF) distance, and/or the like. In some example embodiments, for each cell in a row of the electronic document 135, the machine learning model 115 may be trained to identify a matching entity based at least on the string metric measuring the difference between the content of the cell and the entity. For example, the machine learning model 115 may identify, as the matching entity, the entity "grossAmount" based at least on the entity "grossAmount" having a least Levenshtein distance relative to the content of the second cell 265b.

FIG. 3B depicts an example of a training data 300 for training the machine learning model 115, in accordance with some example embodiments. As shown in FIG. 3B, the training data 300 may include, for one or more entity names, one or more corresponding text values. For example, the same entity "documentNumber" may be referred to as "supplier number," "vendor invoice," "voucher num,"  "document," "your doc," "your invoice details," and/or the like. Accordingly, the machine learning model 115 may be trained, based at least on the training data 300, to recognize variations in the content that may appear in a header field. For instance, the machine learning model 115 may be trained to identify the first cell 265a as a header field containing the entity "documentNumber" whether the first cell 265a contained the text value "invoice number" or a different text value such as "supplier number."

In some example embodiments, the machine learning model 115 may determine, based at least on the string metric between the content of a cell and an entity identified as matching the content, a confidence score for the match. Moreover, the document engine 110 may determine that a cell, such as the first cell 265a and/or the second cell 265b, corresponds to header fields if, for example, the content of the cell matched to an entity with an above threshold confidence score. A row containing one or more cells may be identified as a header row if more than a threshold quantity of the cells are determined to correspond to header fields. For example, as noted, the header row 260 may be identified as such by the document engine 110 if the output of the machine learning model 115 indicates more than a threshold quantity of cells included in the header row 260 are header fields. Further analysis of the electronic document 135, including the extraction of the structured data 250, may be performed based at least on the header fields of the header row 260.

Figure 4:
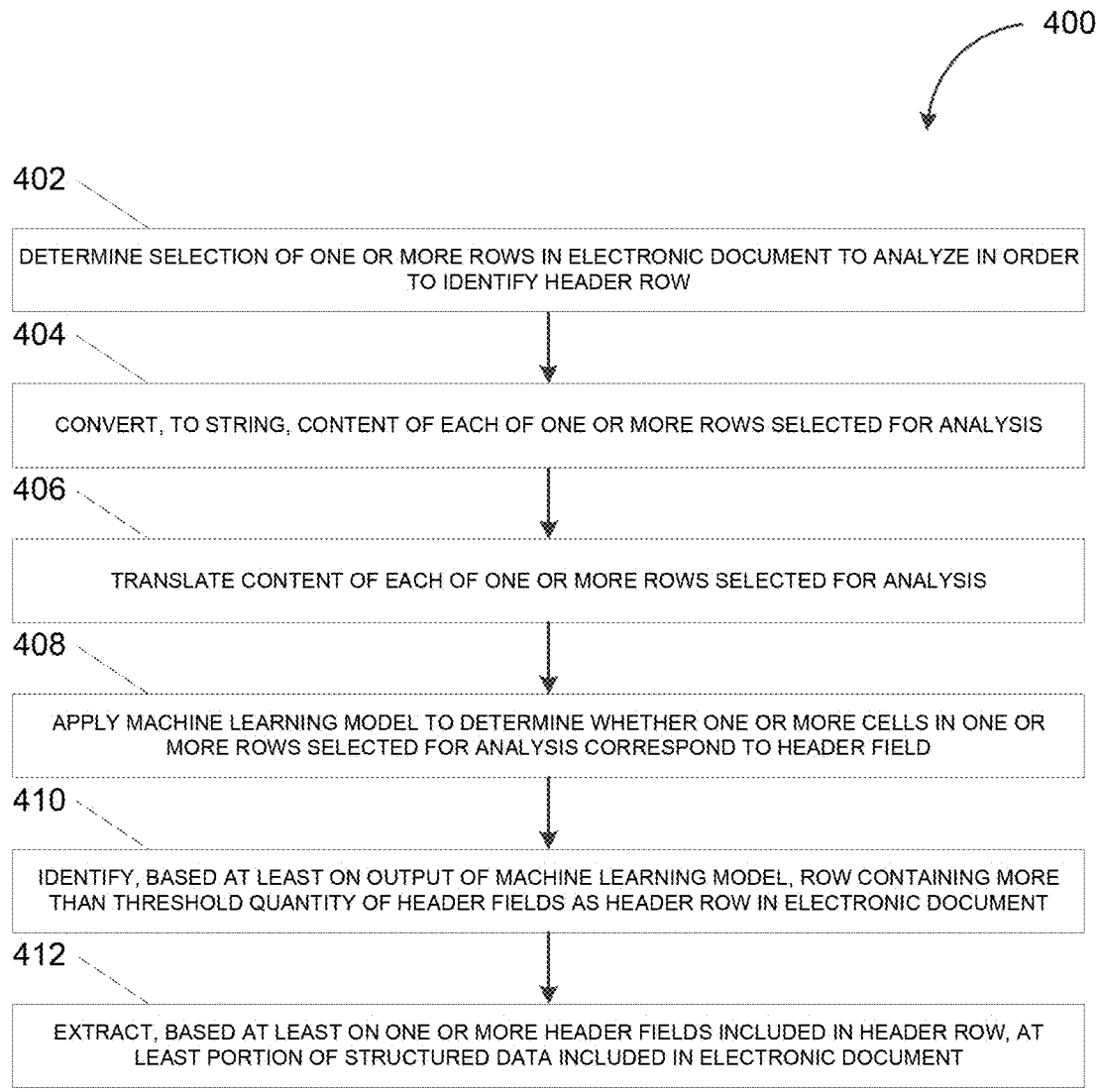
FIG. 4 depicts a flowchart illustrating an example of a process for machine learning enabled text analysis, in accordance with some example embodiments.

FIG. 4 depicts a flowchart illustrating an example of a process 400 for machine learning enabled text analysis, in accordance with some example embodiments. Referring to FIGS. 1-2, 3A-B, and 4, the process 400 may be performed by the document engine 110 in order to analyze, for example, the electronic document 135. For example, the electronic document 135 may be an electronic spreadsheet in which case the document engine 110 may analyze the electronic document 135 by at least identifying and extracting the structured data included in the electronic spreadsheet.

At 402, the document engine 110 may determine a selection of one or more rows in the electronic document 135 to analyze in order to identify a header row. In some example embodiments, the document engine 110 may analyze each row of the electronic document 135 in order to identify one or more header rows indicative of the presence of structured data. In the event the electronic document 135 is a remittance or payment advice containing a breakdown of the invoices included in a payment, the structured data included in the electronic document 135 may correspond to invoice numbers, payment dates, the corresponding amount of remitted payment, and/or the like. To expedite the analysis of the electronic document 135, the document engine 110 may analyze some but not all of the rows in the electronic document 135. For instance, the document engine 110 may limit the analysis to a portion of the electronic document 135, such as the first n quantity of rows, that is most likely to contain the header row 260.

At 404, the document engine 110 may convert, to a string, the content of each of the one or more rows selected for analysis. For example, the document engine 110 may convert, into separate strings, the contents of each of the first n quantity of rows that are being analyzed to identify a header row.

At 406, the document engine 110 may translate the content of each of the one or more rows selected for analysis. In some example embodiments, the document engine 110 may be configured to provide multi-language support in cases where the electronic document 135 contains content in one or more languages that are different than the language associated with the machine learning model 115. For example, in the example shown in FIG. 3, the electronic document 135 may include cells whose content is in a first language (e.g., Italian) and cells having content in a second language (e.g., English). If the machine learning model 115 is associated with the second language, then the document engine 110 may translate, to the second language, the content in the first language. Alternatively, if the machine learning model 115 is associated with a third language, then the document engine 101 may translate, to the third language, the content in the first language and the content in the second language.

At 408, the document engine 110 may apply the machine learning model 115 to determine whether one or more cells in the one or more rows selected for analysis correspond to a header field. In some example embodiments, the machine learning model 115 may be trained to determine a likelihood of each cell in the one or more rows of the electronic document 135 being a header field by at least identifying an entity matching the content of each cell as well as a confidence score for the match. The difference between two strings, such as a first string corresponding to an entity and a second string corresponding to the contents of a cell in the electronic document 135, may be measured based on one or more string metrics or string distance functions. Accordingly, for a cell in a row of the electronic document 135, the machine learning model 115 may be trained to identify a matching entity based at least on the string metric measuring the difference between the content and the entity. For example, the machine learning model 115 may identify, as the matching entity, the entity "grossAmount" based at least on the entity "grossAmount" having a least Levenshtein distance relative to the content of the second cell 265b.

At 410, the document engine 110 may identify, based at least on an output of the machine learning model 115, one or more rows containing more than a threshold quantity of header fields as a header row in the electronic document 135. For example, the document engine 110 may identify the header row 260 as such based at least on the output of the machine learning model 115 indicating that more than a threshold quantity of cells included in the header row 260 are header fields.

At 412, the document engine 110 may extract, based at least on one or more header fields included in the header row, at least a portion of a structured data included in the electronic document 135. In some example embodiments, further analysis of the electronic document 135, including the extraction of the structured data 250, may be performed based at least on the header fields of the header row 260. For example, the document engine 110 may determine, based at least on the entity included in the first cell 265a of the header row 260, that the values extracted from Column J of the electronic document 135 after row 13 correspond to invoice numbers. Alternatively and/or additionally, the document engine 110 may determine, based at least on the entity included in the second cell 265b of the header row 260, that the values extracted from Column M of the electronic document after row 13 correspond to an amount of the corresponding invoice.

Figure 5:
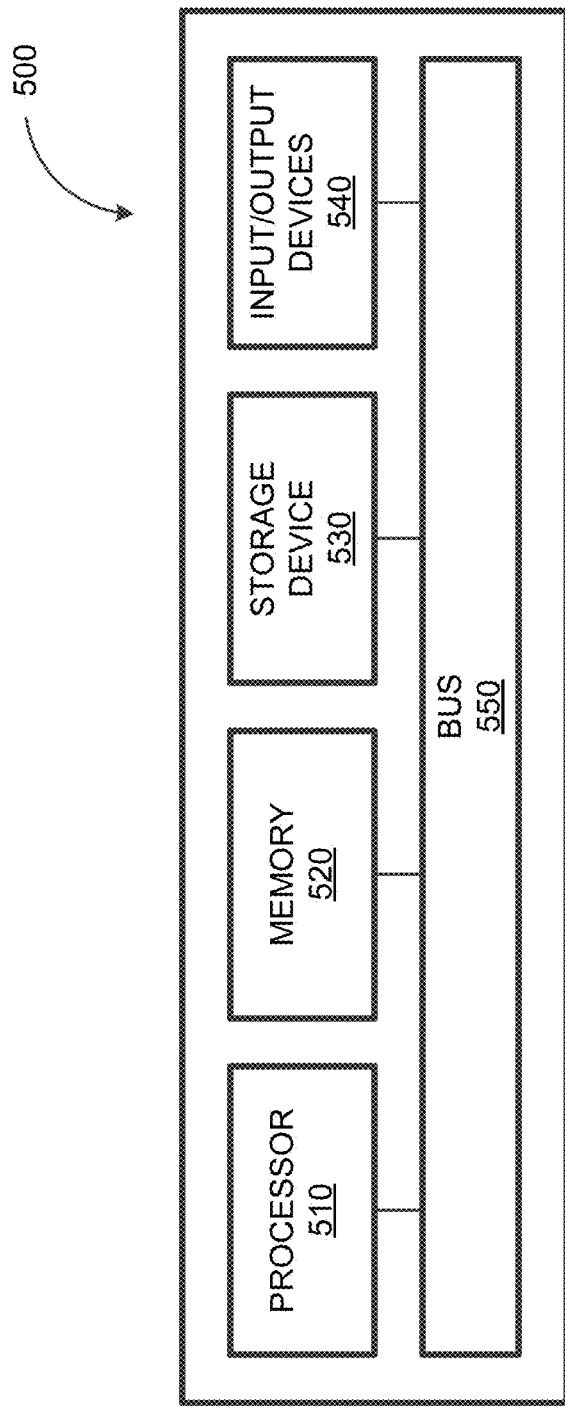
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the document engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the document engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A system, comprising:
at least one data processor; and
at least one memory storing instructions which, when executed by the at least one data processor, result in operations comprising:
identifying, based at least on a likelihood of a row being a header row of a table, a selection of some but not all of a plurality of rows forming a table in an electronic document for analysis to identify the header row of the table;
applying a machine learning model to determine whether the first row corresponds to the header row, the machine learning model determining whether the first row corresponds to the header row by at least determining whether one or more cells in the first row corresponds to a header field, the machine learning model determining whether a first cell in a first column of the first row corresponds to a first header field by at least determining whether a first text value occupying the first cell corresponds to a first entity, and the machine learning model further determining whether a second cell in a second column of the first row corresponds to a second header field by at least determining whether a second text value occupying the second cell corresponds to a second entity;
identifying, based at least on an output of the machine learning model indicating that more than a threshold quantity of cells included in the first row correspond to a header field, that the first row is a header row; and
extracting, based at least on the first entity the first entity occupying the first cell and the second entity occupying the second cell, at least a portion of the structured data included in the electronic document, the structured data including content from one or more subsequent rows in the first column and the second column of the table.

2. The system of claim 1, wherein the machine learning model determines a first string metric measuring a first difference between a first string corresponding to the first text value included in the first cell and a second string corresponding to the first entity, wherein the machine learning model further determines a second string metric measuring a second difference between a third string corresponding to the second text value included in the second cell and a fourth string corresponding to the second entity, and wherein whether the first row corresponds to the header row is determined based at least on the first string metric and the second string metric.

3. The system of claim 1, wherein the electronic document comprises an electronic spreadsheet including unstructured data in addition to the structured data.

4. The system of claim 1, wherein the first entity in the first cell of the first row and the second entity from the second cell of the first row identify the content occupying the one or more subsequent rows in a corresponding column of the table.

5. The system of claim 1, further comprising:
converting, to a string, a content of the first row of the electronic document prior to applying the machine learning model.

6. The system of claim 1, further comprising:
translating, from a first language to a second language associated with the machine learning model, a content of the first row of the electronic document prior to applying the machine learning model.

7. The system of claim 1, wherein the machine learning model comprises a support vector machine, a boosted decision tree, a regularized logistic regression model, a neural network, and/or a random forest.

8. The system of claim 1, further comprising:
training, based at least on a training data, the machine learning model, the training data including one or more different text values corresponding to each of plurality of entity names.

9. A computer-implemented method, comprising:
identifying, based at least on a likelihood of a row being a header row of a table, a selection of some but not all of a plurality of rows forming a table in an electronic document for analysis to identify the header row of the table;
applying a machine learning model to determine whether the first row corresponds to the header row, the machine learning model determining whether the first row corresponds to the header row by at least determining whether one or more cells in the first row corresponds to a header field, the machine learning model determining whether a first cell in a first column of the first row corresponds to a first header field by at least determining whether a first text value occupying the first cell corresponds to a first entity, and the machine learning model further determining whether a second cell in a second column of the first row corresponds to a second header field by at least determining whether a second text value occupying the second cell corresponds to a second entity;
identifying, based at least on an output of the machine learning model indicating that more than a threshold quantity of cells included in the first row correspond to a header field, that the first row is a header row; and
extracting, based at least on the first entity the first entity occupying the first cell and the second entity occupying the second cell, at least a portion of the structured data included in the electronic document, the structured data including content from one or more subsequent rows in the first column and the second column of the table.

10. The method of claim 9, wherein the machine learning model determines a first string metric measuring a first difference between a first string corresponding to the first text value included in the first cell and a second string corresponding to the first entity, wherein the machine learning model further determines a second string metric measuring a second difference between a third string corresponding to the second text value included in the second cell and a fourth string corresponding to the second entity, and wherein whether the first row corresponds to the header row is determined based at least on the first string metric and the second string metric.

11. The method of claim 9, wherein the electronic document comprises an electronic spreadsheet including unstructured data in addition to the structured data.

12. The method of claim 9, wherein the first entity in the first cell of the first row and the second entity from the second cell of the first row identify the content occupying the one or more subsequent rows in a corresponding column of the table.

13. The method of claim 9, further comprising:
converting, to a string, a content of the first row of the electronic document prior to applying the machine learning model.

14. The method of claim 9, further comprising:
translating, from a first language to a second language associated with the machine learning model, a content of the first row of the electronic document prior to applying the machine learning model.

15. The method of claim 9, further comprising:
training, based at least on a training data, the machine learning model, the training data including one or more different text values corresponding to each of plurality of entity names.

16. A non-transitory computer readable medium storing instructions, which when executed by at least one data processor, result in operations comprising:
identifying, based at least on a likelihood of a row being a header row of a table, a selection of some but not all of a plurality of rows forming a table in an electronic document for analysis to identify the header row of the table;
applying a machine learning model to determine whether the first row corresponds to the header row, the machine learning model determining whether the first row corresponds to the header row by at least determining whether one or more cells in the first row corresponds to a header field, the machine learning model determining whether a first cell in a first column of the first row corresponds to a first header field by at least determining whether a first text value occupying the first cell corresponds to a first entity, and the machine learning model further determining whether a second cell in a second column of the first row corresponds to a second header field by at least determining whether a second text value occupying the second cell corresponds to a second entity;
identifying, based at least on an output of the machine learning model indicating that more than a threshold quantity of cells included in the first row correspond to a header field, that the first row is a header row; and
extracting, based at least on the first entity the first entity occupying the first cell and the second entity occupying the second cell, at least a portion of the structured data included in the electronic document, the structured data including content from one or more subsequent rows in the first column and the second column of the table.

* * * * *